United States Patent
Williams (10) Patent No.: US 8,793,321 B2
(45) Date of Patent: Jul. 29, 2014

(54) METHOD AND COMMUNICATION DEVICE FOR PROVIDING A LIST OF PLAYS FOR SPORTING EVENT PARTICIPANTS

(76) Inventor: Charles E. Williams, Henderson, NV (US)

(*) Notice: Subject to any disclaimer, the term of this patent is extended or adjusted under 35 U.S.C. 154(b) by 761 days.

(21) Appl. No.: 12/750,060

(22) Filed: Mar. 30, 2010

(65) Prior Publication Data
US 2011/0246579 A1  Oct. 6, 2011

(51) Int. Cl.
*G06F 15/16* (2006.01)
(52) U.S. Cl.
USPC ............. 709/206; 709/205; 709/224; 463/42
(58) Field of Classification Search
CPC ........................................ G07F 17/32
USPC ............. 709/223–224, 204–207; 463/42, 48
See application file for complete search history.

(56) References Cited

U.S. PATENT DOCUMENTS

| | | | |
|---|---|---|---|
| 6,285,757 B1 | 9/2001 | Carroll et al. | |
| 7,041,032 B1 | 5/2006 | Calvano | |
| 7,281,034 B1* | 10/2007 | Eyal | 709/206 |
| 8,568,236 B2* | 10/2013 | Baray et al. | 463/42 |
| 2003/0163541 A1* | 8/2003 | Austin et al. | 709/207 |
| 2005/0228866 A1* | 10/2005 | Endler et al. | 709/206 |
| 2007/0290801 A1 | 12/2007 | Powell | |
| 2008/0051201 A1* | 2/2008 | Lore | 463/42 |
| 2008/0189215 A1* | 8/2008 | Travez et al. | 725/32 |
| 2008/0268913 A1 | 10/2008 | Heikkinen | |
| 2008/0268951 A1* | 10/2008 | Gropp et al. | 463/42 |
| 2008/0274815 A1* | 11/2008 | Root | 463/48 |
| 2009/0011813 A1* | 1/2009 | Saffron | 463/17 |
| 2009/0048044 A1 | 2/2009 | Oleson et al. | |
| 2009/0048070 A1 | 2/2009 | Vincent et al. | |
| 2009/0060085 A1 | 3/2009 | Nadler et al. | |
| 2009/0138636 A1 | 5/2009 | Burton et al. | |
| 2009/0139764 A1 | 6/2009 | Berry et al. | |
| 2009/0143689 A1 | 6/2009 | Berry et al. | |
| 2009/0163322 A1 | 6/2009 | Andren et al. | |
| 2009/0186679 A1* | 7/2009 | Irvine et al. | 463/16 |
| 2009/0295086 A1* | 12/2009 | Needle et al. | 273/277 |
| 2011/0028207 A1* | 2/2011 | Gagner et al. | 463/42 |
| 2011/0295994 A1* | 12/2011 | Herzog et al. | 709/224 |

\* cited by examiner

*Primary Examiner* — Bharat N Barot (57) ABSTRACT

A communication device for event participants includes a communication module and a controller coupled to the communication module. The controller is configured to at least one of receive and generate a list of messages for an event participant, store the list of messages in the communication device, receive event information through the communication module, and modify the list of messages based on the received event information.

20 Claims, 5 Drawing Sheets

METHOD AND COMMUNICATION DEVICE FOR PROVIDING A LIST OF PLAYS FOR SPORTING EVENT PARTICIPANTS

BACKGROUND OF THE INVENTION

The subject matter described herein relates generally to sporting events and, more particularly, to a method and apparatus for communicating with sporting event participants.

At least some know sporting events, such as team-oriented athletic events, involve different participants that perform distinct roles during the event and that receive direction during the event. For example, an athletic game may include a plurality of athletes that receive directions from one or more coaches. The coaches may direct the athletes to perform specific plays at specific times. In at least some known athletic games, the coaches are often separated from the players by a distance that makes oral communication of the plays to the players from the coaches difficult and/or impractical. Moreover, athletic games such as football are often played in stadiums or other venues that may be filled with spectators, and a noise level generated by the spectators can also impede communication between coaches and players.

At least one known device for communicating from coaches to players uses a radio system contained within a player's helmet. The helmet may contain a radio receiver that communicates with a radio transmitter used by a coach. However, if the spectators or noise within the stadium are too loud, the player may still be unable to hear communications from the coach. As such, plays communicated by the coach may not be received or may be misunderstood by one or more players.

BRIEF DESCRIPTION OF THE INVENTION

In one embodiment, a communication device for event participants is provided that includes a communication module and a controller coupled to the communication module. The controller is configured to at least one of receive and generate a list of messages for an event participant, store the list of messages in the communication device, receive event information through the communication module, and modify the list of messages based on the received event information.

In another embodiment, a communication system for event participants is provided that includes a plurality of communication devices configured to be communicatively coupled together. Each communication device includes a communication module and a controller coupled to the communication module. The controller is configured to at least one of receive and generate a list of messages for an event participant, store the list of messages in the communication device, receive event information through the communication module, and modify the list of messages based on the received event information.

In yet another embodiment, a method for communicating with event participants is provided that includes providing a plurality of communication devices, communicatively coupling together a first plurality of communication devices of the plurality of communication devices to form a first network, and transmitting data including at least one of audio signals and at least one message within the first network.

DETAILED DESCRIPTION OF THE INVENTION

While the embodiments are described herein being used within the game of football, the embodiments and devices described herein may be used within any suitable sporting event, athletic event, and/or any other event.

Figure 1:
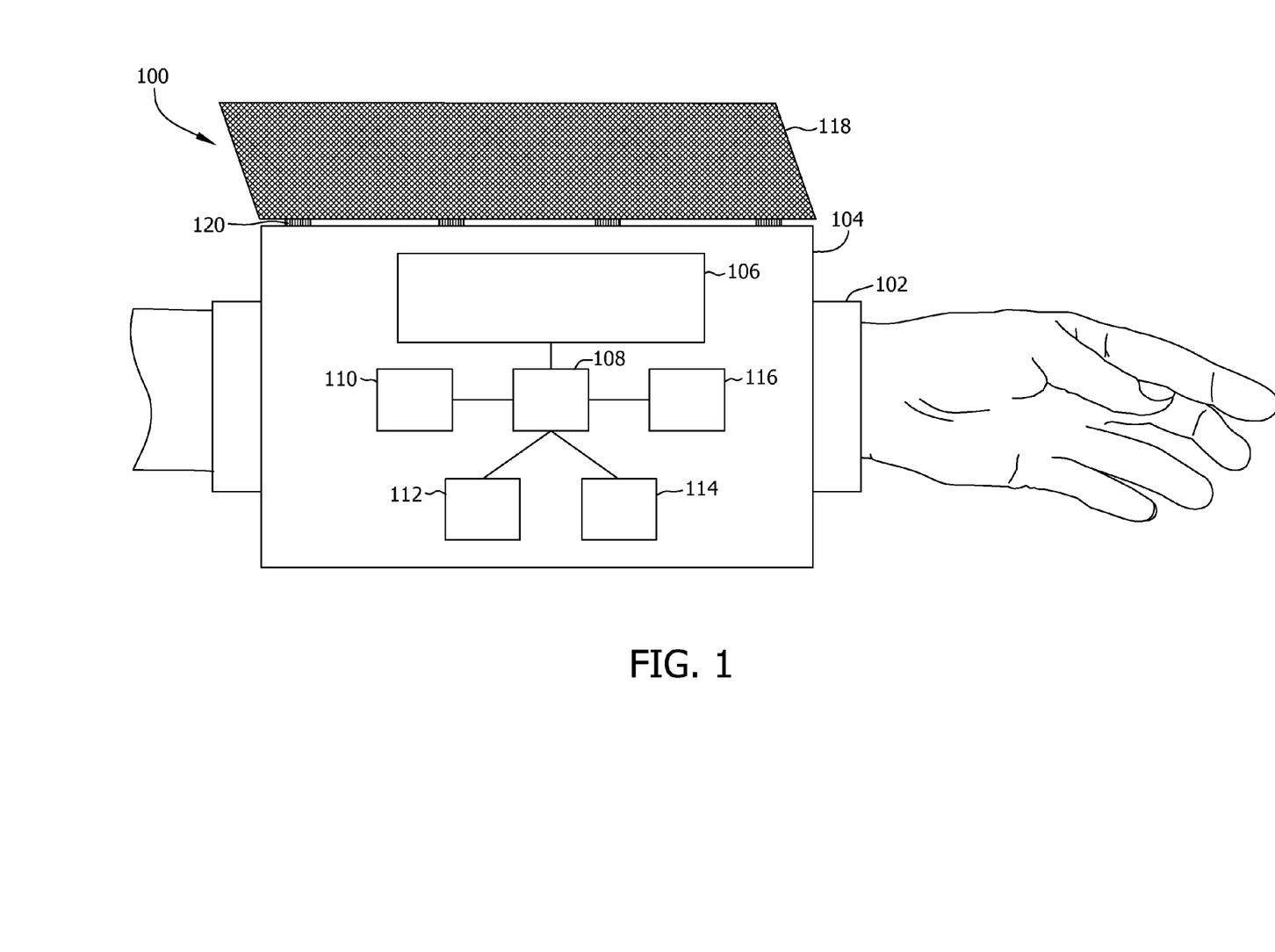
FIG. 1 is a block diagram of an exemplary communication device.

FIG. 1 illustrates an exemplary communication device 100 that may be used in events such as athletic games to enable two-way communication as described herein. More specifically, in the exemplary embodiment, device 100 is described as being used in a football game. Moreover, in the exemplary embodiment, communication device 100 includes a coupling device 102 and a housing 104. Coupling device 102 enables housing 104 to be coupled to a desired location on a participant, such as on a wrist or arm of an athlete. Coupling device 102 may include, but is not limited to only including, hook and loop fasteners, an elastic band, fasteners, snaps, buckles, athletic tape, and/or any suitable fastener mechanism that enables housing 104 to be coupled to a suitable location. Moreover, in the exemplary embodiment, coupling device 102 is designed to be water-resistant and impact-resistant such that housing 104 is retained on the athlete's wrist or arm during high impact or high contact sporting events, such as football games.

In the exemplary embodiment, housing 104 includes a display 106, a processor 108, a memory 110, a user interface 112, a communication module 114, and an audio module 116. Moreover, in the exemplary embodiment, housing 104 includes at least one power source (not shown), such as one or more batteries, that provides power to the components contained within housing 104. Display 106, memory 110, user interface 112, communication module 114, and audio module 116 are coupled to processor 108 and are in data communication with processor 108. In the exemplary embodiment, housing 104 is also impact-resistant to facilitate protecting the components within housing 104 during high impact events. In one embodiment, housing 104 is at least partially deformable, such that housing 104 at least partially bends when impacted. Alternatively or additionally, in the exemplary embodiment, housing 104 includes a cover 118 that facilitates protecting components of communication device 100, such as display 106, user interface 112, and/or any suitable component of communication device 100. Cover 118 is selectively movable relative to the other components contained within housing 104. For example, cover 118 may be hinged, slidably, and/or foldably coupled to housing 104 via a coupling mechanism 120 to enable cover 118 to be selectively opened and closed to provide access to display 106, user interface 112, and/or other components of communication device 100. For example, when a play is about to be initiated during game play, a user may close cover 118 to facilitate protecting communication device 100 from impact.

Display 106 may include, but is not limited to only including, a liquid crystal display (LCD), a light-emitting diode (LED) display, a plasma display, and/or any suitable visual output device that enables graphical data and text to be displayed a user. In one embodiment, display 106 includes one or more LEDs and/or other suitable devices that provide coloring and/or lighting (such as backlighting) to one or more portions of housing 104. In another embodiment, housing 104 includes multiple displays 106. In the exemplary embodiment, display 106 is a touch screen that enables a user to input data into communication device 100.

Processor 108 transmits and receives data to and from, and controls an operation of one or more components of communication device 100. As used herein, the term "processor" is not limited to just those integrated circuits referred to in the art as a processor, but broadly refers to a microcontroller, a microcomputer, a programmable logic controller (PLC), an application specific integrated circuit, and other programmable circuits, and these terms are used interchangeably herein.

Memory 110 includes a computer readable medium, such as, without limitation, random access memory (RAM), flash memory, a hard disk drive, a solid state drive, a flash drive, a compact disc, a digital video disc, and/or any suitable memory that enables processor 108 to store, retrieve, and/or execute instructions and/or data. In the exemplary embodiment, memory 110 includes and/or receives a list of plays (not shown in FIG. 1) that may be accessed and/or displayed by communication device 100.

User interface 112 includes, without limitation, a keyboard, a keypad, a mouse, a scroll wheel, a pointing device, an audio input device employing speech-recognition software, and/or any suitable device that enables a user to input data into communication device 100 and/or retrieve data from communication device 100 as described herein. In one embodiment, user interface 112 is at least partially integrated within display 106, such as within a touch screen. In the exemplary embodiment, user interface 112 also includes at least one button and/or switch that enables a user to access additional or alternative functions of communication device 100, as described more fully herein.

Communication module 114 includes, without limitation, a wireless radio-frequency (RF) transceiver. Communication module 114 may be configured to connect to a network and/or to other communication devices 100 using any suitable communication protocol, such as, without limitation, an Institute of Electronics and Electrical Engineers (IEEE) 802.11 protocol, an IEEE 802.15 protocol, and/or an IEEE 802.16 protocol. Moreover, communication module 114 may use spread spectrum, frequency hopping, and/or any suitable technique to facilitate reducing or eliminating RF interference with communication module 114. In one embodiment, communication module 114 communicates with a wireless headset (not shown), such as an athletic helmet, to enable data to be transmitted and received between communication device 100 and the headset.

In the exemplary embodiment, audio module 116 includes a microphone and at least one speaker. Audio module 116 uses noise cancellation and/or filtering technology to substantially eliminate background noise that may be present within an event venue, such as a football stadium, from entering the microphone and/or the speaker. Moreover, the microphone and/or speaker(s) of audio module 116 may be selectively disabled or muted if communication device 100 is coupled to an external speaker and/or microphone (not shown), such as a speaker and/or a microphone within a helmet or a headset. Audio module 116 enables a user to transmit and receive audio signals from one communication module 114 and/or communication device 100 to another communication module 114 and/or communication device 100. As such, audio module 116 enables audio communication between users of different communication devices 100 and/or other suitable devices.

In one embodiment, communication device 100 includes a global positioning satellite (GPS) system that enables a location of device 100 to be monitored and/or tracked. For example, if communication device 100 is misplaced or lost, the GPS system facilitates enabling the owner to locate and retrieve device 100.

Figure 2:
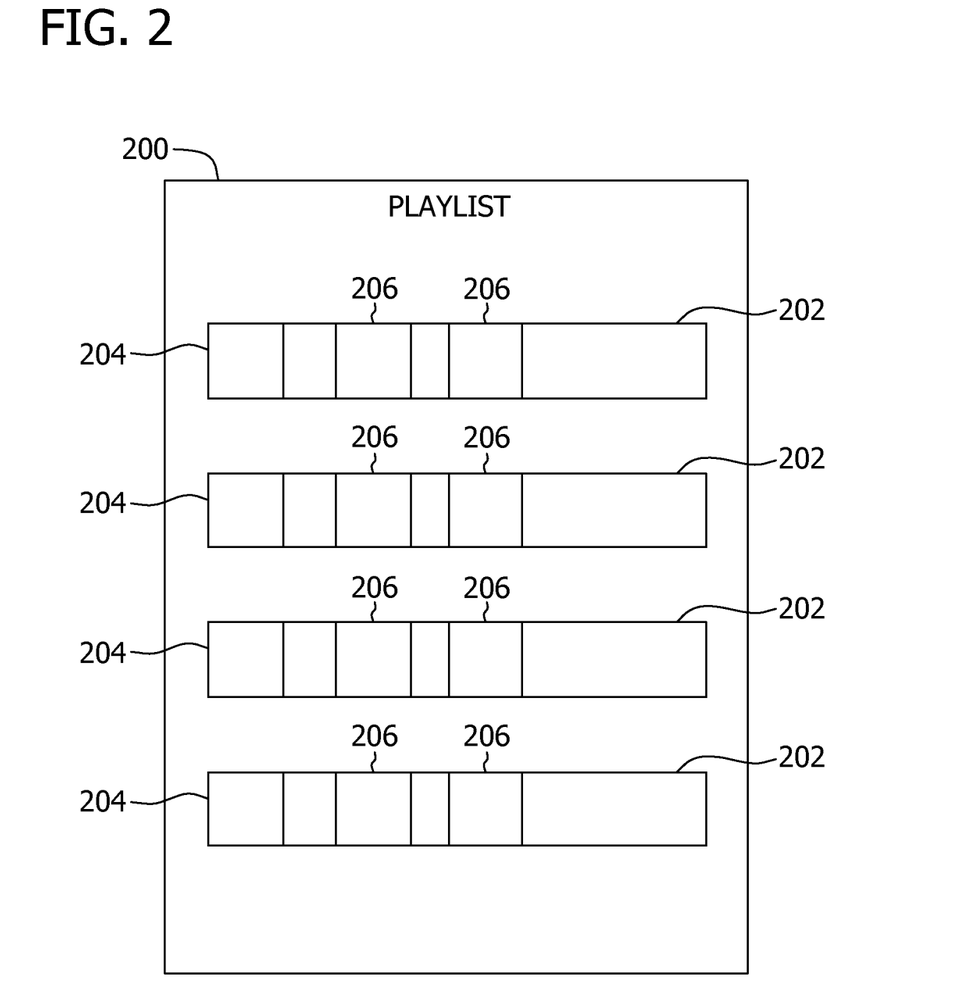
FIG. 2 is a block diagram of an exemplary list of communication messages that may be selected to be transmitted for use with the communication device shown in FIG. 1.

FIG. 2 illustrates an exemplary list 200 (or playlist) of communication messages or plays 202, such as offensive, defensive, or special teams plays, or other sequence of events that may be selectively generated, received, and/or stored within communication device 100, such as within memory 110 (shown in FIG. 1). As used herein, in the exemplary embodiment, list 200 is a listing of desired plays, wherein each "play" refers to a predefined action or set of actions that an athlete or a group of athletes (such as a team) should perform at or within a specific time, such as during a specific "down" of a football game.

In the exemplary embodiment, memory 110 includes any suitable number of playlists 200, and any suitable number of plays 202 within playlist 200. Each play 202 included within playlist 200 includes at least one play image 204 and at least one associated data field 206 that may be used, for example, to categorize, order, sort, and/or determine a sequence of plays 202 to display. In one embodiment, play image 204 provides a visual representation of a play to be executed (or "run") by a team and/or an athlete. For example, in one exemplary embodiment, play image 204 displays a formation of the team members upon the field of play, and includes a visual depiction of the actions that each team member should take (i.e., a route that each player should run, blocking schemes of other players, etc.). Image 204 may also include text and/or notes that describe one or more aspects of play 202. Alternatively, play image 204 may include any suitable visual and/or graphical representation of a play 202 and/or image 204 may include a link to an audio selection included within or associated with play 202.

Data fields 206 provide information associated with each play 202, such as a suitable situation in which play 202 should be run. For example, typical information that can be included within data fields 206 and associated with each play 202 may include, without limitation, whether play 202 is designed to be run in a particular field location, within certain yard lines, along, towards, and/or near the sidelines of the field, and/or within a particular area of the field (such as the area of a field known as the "red zone"), whether play 202 is a running play, a passing play, a trick play, or other suitable play type, whether play 202 is a defensive play, an offensive play, or a special teams play, and/or whether play 202 is designed to be used during a particular down (e.g., whether play 202 is a first down play, a second down play, etc.). Moreover, each play 202 may include additional information within data fields 206, such as an expected yardage gain for each play 202, a code name, play number, and/or other identifier for each play 202, and/or a specific opposing team that each play 202 is suitable to be used against. Each data field 206 may also include a note field for optionally entering and/or displaying text, such as text indicating a likelihood of success or the effectiveness of each play 202 based on data accumulated from the current game or based on historical data accumulated from previous games against the same opposing team and/or other teams, and/or any suitable text. Additionally, a user, such as an athlete or a coach, may record an audio file and associate the audio file with a particular play 202, such as their opinions or thoughts about how effectively each play 202 was run against the opposing team and/or pitfalls or reminders about that particular play. Furthermore, in one embodiment, each play 202 may be modified after being downloaded into communication device 100. Specifically, in the exemplary embodiment, device 100 is dynamic and plays 202 may be modified, synchronized, and/or updated between other communication devices 100 and/or downloaded to a computer and/or other suitable device as desired.

Each play 202 may be rank-ordered, sorted, and/or filtered by one or more data fields 206. More specifically, plays 202 may be rank-ordered, sorted, and/or filtered based on the play number, the play type, the down number, the field location, the opposing team, the elapsed time in the game, and/or any other suitable criteria that may be input in data fields 206 and displayed on display 106 (shown in FIG. 1). Moreover, plays 202 may be filtered to prevent certain plays from being displayed based on undesired data field 206 values. For example, only "red zone" plays 202 may be displayed, only running plays 202 may be displayed, and/or only first down plays 202 may be selected to be displayed. The filtering, sorting, and/or rank-ordering of plays 202 is variably selected and dynamic, such that a user may change the filtering, sorting, and/or the rank-ordering of plays 202 at any suitable time including in real-time, such as while a game is being played, by using processor 108 (shown in FIG. 1) to filter out, prioritize, and/or deprioritize specific data fields 206. As used herein, the terms "prioritize" and "deprioritize" refer to increasing or decreasing, respectively, a weighting and/or a placement of plays 202 within the rank-ordering of playlist 200, (i.e., a prioritized play 202 is generally displayed before a deprioritized play 202) and/or increasing a likelihood of a play 202 being displayed or not being displayed. For example, plays 202 identified as running plays may be weighted and/or prioritized higher than other plays 202 such that the running plays 202 have a greater probability of being displayed before other plays 202.

In one embodiment, a master playlist (not shown) is downloaded and/or stored within communication device 100. The master playlist includes all plays 202 that a particular team has available for use, or a suitable subset thereof. One or more playlists 200 may be generated and/or selected from the master playlist.

In one embodiment, communication device 100 is substantially synchronized with a third party system, such as a time clock, a scoreboard computer, a timekeeper computer, or other computer, and/or any suitable system or device. In such an embodiment, communication device 100 receives event information, such as an amount of time left in a quarter or game, an amount of time remaining on a play clock, a current down number, a current yard location on the field, and/or any suitable data. Such received information may be displayed to a user via display 106 and/or via any other suitable component of communication device 100. For example, in one embodiment, if device 100 receives data indicating that less than two minutes remain in the game, audio module 116 (shown in FIG. 1) emits a tone, beep, alarm, and/or any other suitable audial alert to notify the user. Moreover, communication device 100 may automatically adjust the information displayed on display 106 based on the event information received. For example, in one embodiment, communication device 100 adds and/or removes one or more plays 202 within playlist 200 based on the received event information. For instance, in one embodiment, communication device 100 receives event information that indicates that the current down number is first down. Automatically, in such an embodiment, all plays 202 are removed from display 106 and/or playlist 200 except those designated in data fields 206 as first down plays 202. The modified or filtered playlist 200 is then displayed on display 106. In another example, communication device 100 receives event information indicating that the team has progressed to, or is starting their engagement in, a specific area of the playing field, such as in the red zone. In such an example, all plays 202 are removed from display 106 and/or playlist 200 except those designated in data fields 206 as red zone plays 202. The modified or filtered playlist 200 is then displayed to the user on display 106. In a further embodiment, communication device 100 may indicate that the ball location is within the red zone by, for example, displaying a red shading, a red lighting, and/or a red border within display 106, or any suitably colored shading, display, and/or border.

Communication device 100 may also modify an order of plays 202 within playlist 200 based on the received event information. For example, if communication device 100 receives event information indicating that the current down number is first down, communication device 100 may prioritize first down plays 202 higher than other plays 202 within playlist 200 and/or may provide the user an option to selectively view other plays 202 in playlist 200. Playlist 200 displays plays 202 leveling a rank-order or on a prioritized basis such that all first down plays 202 are displayed first, and the remaining plays 202 within playlist 200 are displayed after the first down plays 202.

Figure 3:
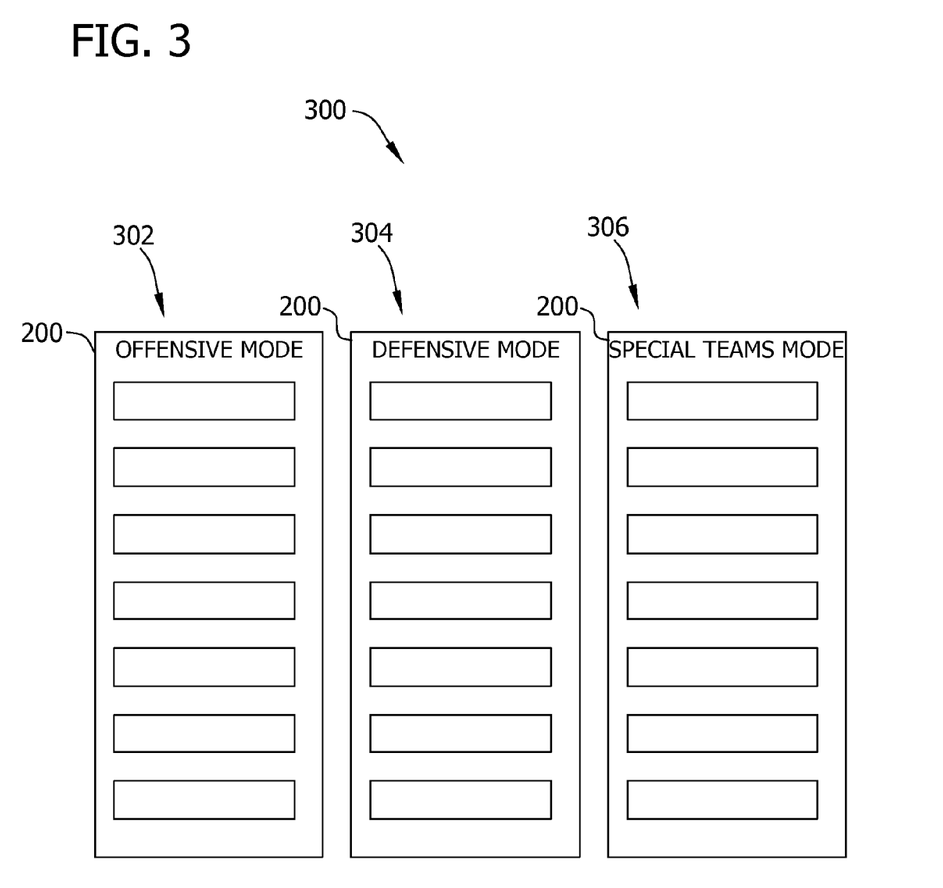
FIG. 3 is a block diagram of exemplary modes of operation of the communication device shown in FIG. 1.
Figure 4:
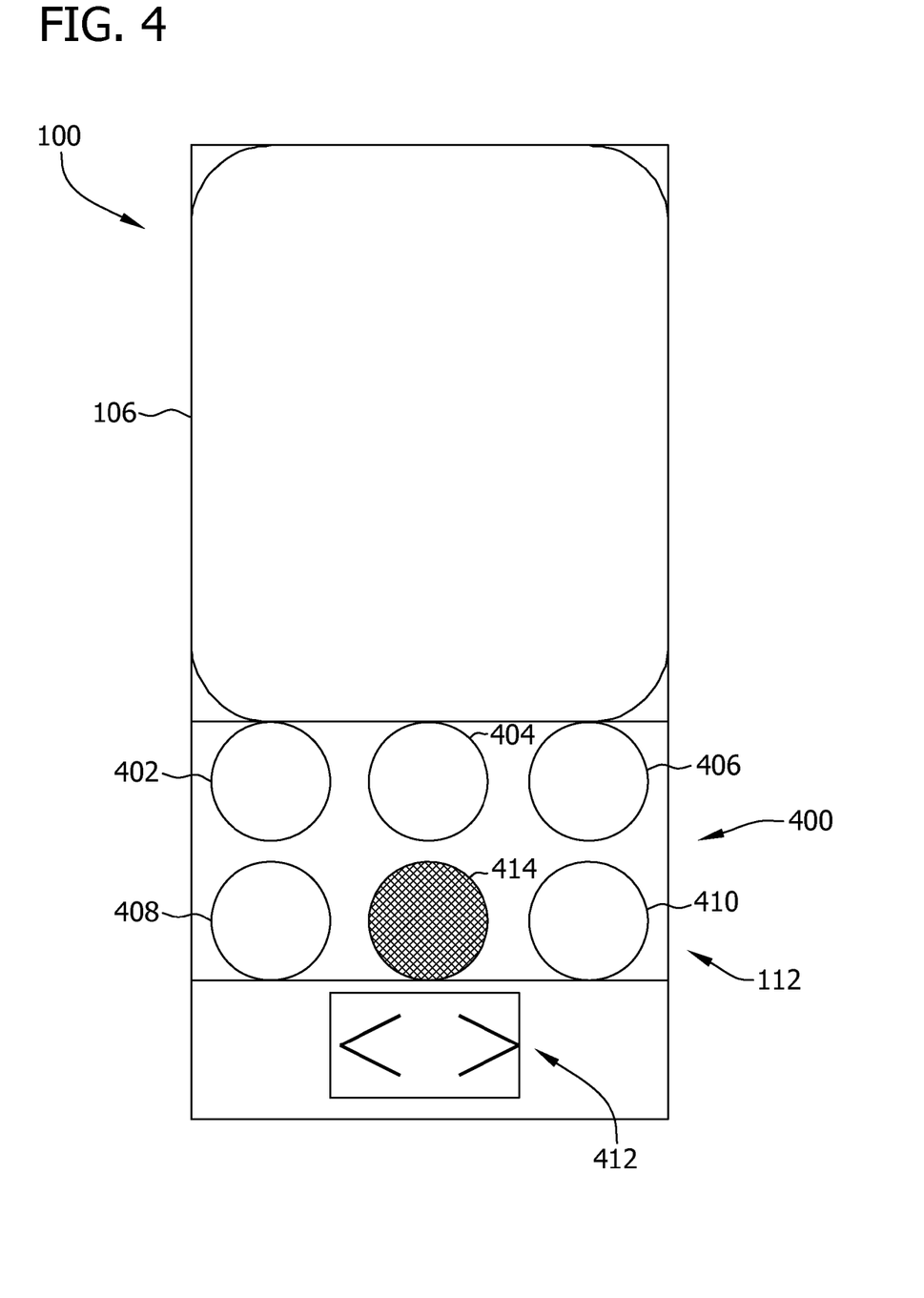
FIG. 4 is a block diagram of a specific embodiment of the communication device shown in FIG. 1.

FIG. 3 illustrates exemplary modes 300 of operation of communication device 100 (shown in FIG. 1). FIG. 4 illustrates a specific embodiment of communication device 100. Although FIG. 3 illustrates only three modes 300 of operation, communication device 100 may be configured to operate using any suitable number of modes 300. In the exemplary embodiment, when communication device 100 is operating in a first mode 302 (such as an offensive mode), a first playlist 200 is displayed with a first plurality of plays 202. When communication device 100 is operating in a second mode 304 (such as a defensive mode), a second playlist 200 is displayed with a second plurality of plays 202 wherein at least some of the plays 202 may be different than those displayed in the first mode 302 of operation. When communication device 100 is operating in a third mode 306 (such as a special teams mode), a third playlist 200 is displayed with a third plurality of plays 202. In the exemplary embodiment, each of first playlist 200, second playlist 200, and third playlist 200 includes at least one play 202 that is not present in the other playlists. Alternatively, first playlist 200, second playlist 200, and/or third playlist 200 include substantially similar plays 202, but different plays 202 may be filtered and/or displayed within each playlist.

In the exemplary embodiment, a separate playlist 200 may be displayed on display 106 (shown in FIG. 1) during each mode 300. For example, when communication device 100 is operating in offensive mode 302, only plays 202 identified in data fields 206 (shown in FIG. 2) as being offensive (or other suitable value) are displayed. However, when communication device 100 is operating in defensive mode 304 or special teams mode 306, only plays 202 identified in data fields 206 as associated with defensive or special teams, respectively, are displayed.

As shown in FIG. 4, in one configuration of communication device 100, a plurality of buttons 400 are included within user interface 112, such as an offensive mode button 402, a defensive mode button 404, and a special teams mode button 406. A user may selectively toggle between various modes 300 of operation by pressing offensive mode button 402, defensive mode button 404, and/or special teams mode button 406. For example, communication device 100 enters offensive mode 302 when offensive mode button 402 is depressed, defensive mode 304 when defensive mode button 404 is depressed, and special teams mode 306 when special teams mode button 406 is depressed. Alternatively, buttons 400 may be configured in any suitable manner that enables a user to selectively enter any suitable mode 300 as desired. Moreover, as shown in FIG. 4, user interface 112 includes a power-on button 408 and a power-off button 410 that energize and deenergize communication device 100, respectively. User interface 112 also includes volume buttons 412 for adjusting an audio output level of a speaker 414 within audio module 116 (shown in FIG. 1). In an alternative embodiment, one or more buttons 400 are embodied within a touch screen within user interface 112 and/or display 106. In a further alternative embodiment, user interface 112 and/or communication device 100 includes any suitable number and arrangement of buttons 400 that enables device 100 to function as described herein.

Figure 5:
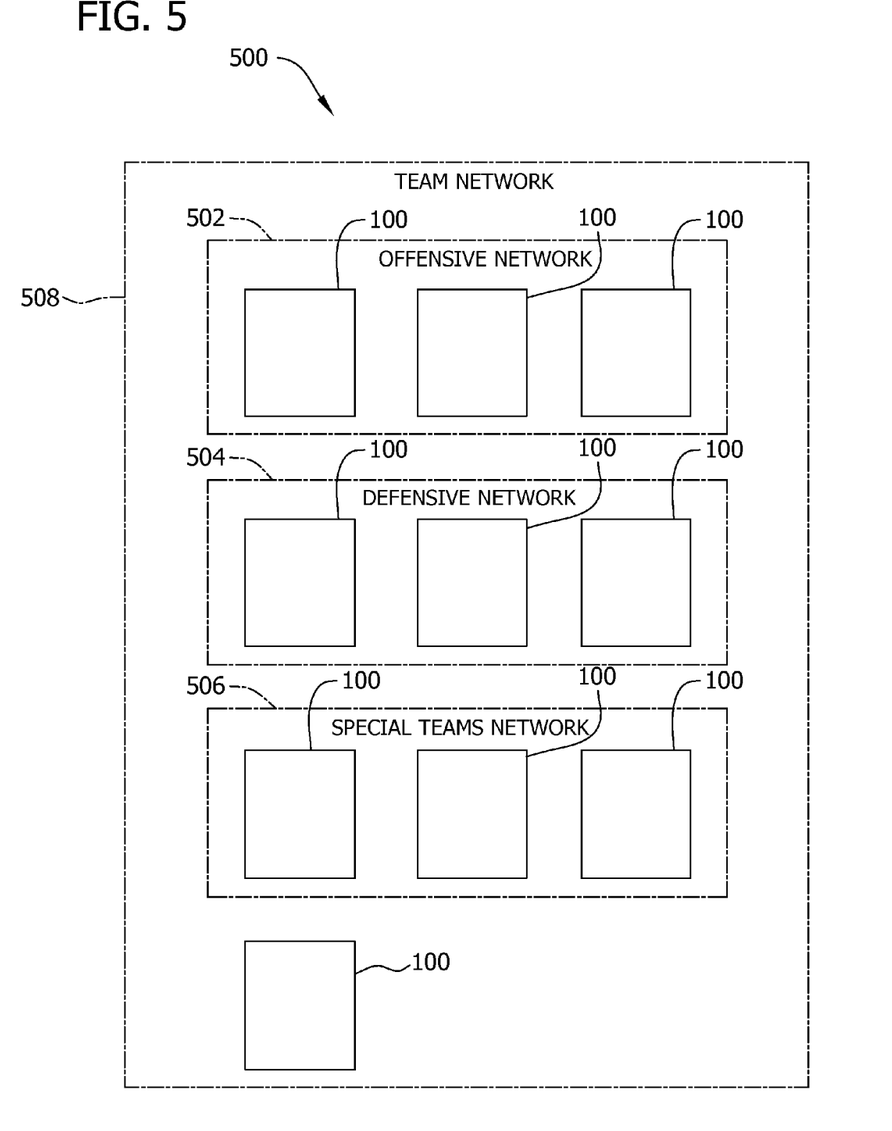
FIG. 5 is a block diagram of exemplary networks for use with the communication device shown in FIG. 1.

FIG. 5 illustrates exemplary networks 500 of communication devices 100. In the exemplary embodiment, a plurality of communication devices 100 are coupled in at least one network 500 based on the particular mode 300 (shown in FIG. 3) of operation that device 100 is operating in. Moreover, each communication device 100 may be configured to operate in any mode 300. More specifically, each network 500 includes all communication devices 100 that are operating within a particular mode 300. For example, each communication device 100 operating in an offensive mode 302 (shown in FIG. 3) of operation communicates with every other communication device 100 operating in the same mode 302 such that a first or offensive network 502 is formed. Similarly, communication devices 100 operating in a defensive mode 304 (shown in FIG. 3) of operation form a second or defensive network 504, and communication devices 100 operating in a special teams mode 306 (shown in FIG. 3) of operation form a third or special teams network 506. A fourth or team network 508 may be formed that includes at least one communication device 100 operating in each mode 302, 304, and 306 of operation. In such an embodiment, a head coach, a game manager, or other suitable user may operate a communication device 100 in a fourth mode (not shown) of operation that is capable of communicating with other communication devices 100 through the team network 508 to transmit and/or receive data from any or all other communication devices 100. A suitable icon or other notification may be displayed on display 106 of each communication device 100 to indicate which operating mode 300 and/or network 500 that each communication device 100 is operating within. Moreover, data, including audio signals, plays 202, and/or playlists 200 (both shown in FIG. 2), are transmitted and received within each network 500 by the devices 100 within the same network 500.

As such, a plurality of networks 500 may be formed that are each distinct, such that the devices 100 in each network 500 only communicate with those devices 100 in their respective network 500. For example, defensive coaches and one or more defensive players may operate a plurality of communication devices 100 in a defensive mode 304 of operation in a defensive network 504. Network 504 will only receive data relating to those plays 202 identified as applicable to defensive network 504 and will not receive data relating to those plays 202 identified as applicable to other networks 500. Similarly, offensive coaches and one or more offensive players (such as a quarterback) may operate a plurality of communication devices 100 in an offensive mode 302 of operation in an offensive network 502, and special teams coaches and one or more special teams players may operate a plurality of communication devices 100 in a special teams mode 306 of operation in a special teams network 506.

Accordingly, in the exemplary embodiment, all data transmitted and received within one network 500 is prevented from being transmitted and received within other networks 500. For example, data transmitted and received within defensive network 504 is not transmitted or received within offensive network 502, special teams network 506, or team network 508. However, since team network 508 may include one or more communication devices 100 within one or more networks 500 such as defensive network 504, offensive network 502, and/or special teams network 506, data transmitted and received within team network 508 (i.e., communication devices 100 operating in the fourth mode or head coach mode) may be transmitted and received within any networks 500 and/or communication devices 100 of team network 508. Alternatively, networks 500 may be configured in any suitable manner. For example, in one embodiment, networks 500 may overlap with other networks as desired, such that data transmitted and received within networks 500 may be shared (i.e., transmitted and received within all overlapping networks 500). For example, special teams network 506 may at least partially overlap defensive network 504 and/or offensive network 502.

Alternatively or additionally, users may transmit and/or receive data to and/or from only specified or designated communication devices 100, rather than to all communication devices 100 within a network 500. In such embodiment, each communication device 100 includes a unique identification number or other identifier that enables each communication device 100 within a network 500 to be distinguished from other communication devices 100 within network 500. A user may select a specific communication device 100 to transmit data to or receive data from by, for example, selecting a communication device 100 from a list of available communication devices 100 within display 106.

During operation, in the exemplary embodiment, a plurality of communication devices 100 are used by, for example, a quarterback, a defensive captain, a special teams captain, and/or one or more coaches and/or coordinators. Alternatively, any suitable player, athlete, and/or other suitable person may use communication device 100. In the exemplary embodiment, devices 100 are worn on a wrist or arm of a user, such as a player and/or a coach. Moreover, in the exemplary embodiment, one or more communication devices 100 may operate in a low-power state to facilitate reducing power consumption and/or to prolong battery life.

In one example, if a football team is in possession of a football, a head coach, one or more offensive coaches or coordinators, and/or one or more players, such as a quarterback, operate individual communication devices 100 in offensive mode 302. In addition, at least one coach may operate a device in a team network 508. The head coach selects one or more plays 202 and/or playlists 200 for the offensive team to execute. Using device 100, the head coach transmits the one or more plays 202 and/or playlists 200 to one or more offensive coaches and/or directly to a player, such as the quarterback. In addition, or in the alternative, an offensive coach or coaches may also transmit one or more plays 202 and/or playlists 200 to the quarterback. Alternatively, the head coach or other coaches may use a computer or other data device to select and transmit one or more plays 202 to one or more communication devices 100 within offensive network 502 and/or team network 508. In the exemplary embodiment, the quarterback receives plays 202 and/or playlists 200 on communication device 100, and views plays 202 and/or playlists 200 on display 106. Plays 202 and/or playlist 200 may be filtered, sorted, and/or rank-ordered based on data contained in data fields 206. The quarterback may scroll through plays 202 using user interface 112, and may select a play 202 to view an image of the play 202 and/or any data associated with each play 202. The quarterback may then communicate play 202 to other offensive players within a huddle to enable the offensive team to execute play 202.

In one embodiment, communication devices 100 receive event information from a computer or other suitable device that identifies one or more status aspects of the game, such as an amount of time left in the game or quarter, a field location of the ball, a current down number, a number of time-outs remaining, and/or any suitable information. Communication device 100 automatically filters, sorts, and/or rank-orders plays 202 based on the received event information as described more fully herein. As such, the head coach, offensive coaches, quarterback, and/or any suitable user may quickly view more useful and/or relevant plays 202, according to the current state of the game, before other less useful and/or less relevant plays 202 are displayed. Therefore, if the received event information indicates that the current down number is first down, the head coach can quickly view first down plays 202 and select a desired first down play 202 to transmit to the offensive coaches and/or the quarterback. Moreover, the head coach and/or other users may filter and/or order plays 202 based on any suitable data field 206 and/or combination of data fields 206.

In a similar manner, if the football team is in a defensive or a special teams situation, the head coach, defensive coaches, special teams coaches, and/or any suitable user may select defensive plays 202 and/or special teams plays 202 to transmit to appropriate communication devices 100 within appropriate networks 500, as described more fully herein.

A technical effect of the systems and method described herein includes at least one of: (a) providing a plurality of communication devices; (b) communicatively coupling together a first plurality of communication devices of a plurality of communication devices to form a first network; and (c) transmitting at least one of audio signals and at least one play within a network.

The above-described embodiments facilitate providing a portable and robust communication device for events such as, without limitation, athletic events and sporting events. The communication device facilitates enabling constant and/or selective communication between one or more coaches and one or more players in a game. The communication device enables one or more plays and/or playlists to be transmitted and received between the coaches and players to facilitate selecting a desired play or plays to execute within the game. Images and/or details associated with the plays or playlists may be viewed and/or modified within the communication devices. The plays and/or playlists may be filtered or modified such that only certain types or categories of plays are displayed, or such that certain types or categories of plays are displayed before other plays. Event information may be received by the communication devices and one or more playlists may be modified based on the received event information. Moreover, each communication device may be operated in one or more modes, and one or more networks of communication devices may be formed based on the modes.

Exemplary embodiments of a communication device, a communication system, and a method for communicating with event participants are described above in detail. The method, device, and system are not limited to the specific embodiments described herein, but rather, components of the device and/or system and/or steps of the method may be utilized independently and separately from other components and/or steps described herein. For example, the communication device may also be used in combination with other events, and is not limited to practice with only the events or games as described herein. Rather, the exemplary embodiment can be implemented and utilized in connection with many other sporting event, athletic event, and/or other communication applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A communication device for use in a sporting event by sporting event participants, said communication device comprising:
   a communication module;
   a controller coupled to said communication module, said controller configured to:
      at least one of receive and generate a list of plays to be performed by a sporting event participant;
      store the list of plays in said communication device;
      receive event information associated with the sporting event through said communication module; and
      modify the list of plays based on the received event information.

2. A communication device in accordance with claim 1, wherein said controller is further configured to prioritize the list of plays based on the received event information.

3. A communication device in accordance with claim 1, further comprising a display configured to display at least one graphical indication associated with the received event information.

4. A communication device in accordance with claim 1, wherein said controller is further configured to selectively display only a portion of the list of plays based on the received event information.

5. A communication device in accordance with claim 1, wherein said communication device is configured to associate data received with at least one of the plays in the list of plays.

6. A communication device in accordance with claim 1, wherein said communication device is configured to:
   wirelessly communicate data associated with at least one play selected from the list of plays; and
   update the list of plays in real-time during the sporting event.

7. A communication system for use in a sporting event by sporting event participants, said communication system comprising:
   a plurality of communication devices configured to be communicatively coupled together, each said communication device comprising:
      a communication module; and a controller coupled to said communication module, said controller configured to:
  at least one of receive and generate a list of plays to be performed by a sporting event participant;
  store the list of plays in said communication device;
  receive event information associated with the sporting event through said communication module; and
  modify the list of plays based on the received event information.

8. A communication system in accordance with claim 7, further comprising a first communication device, a second communication device, and a third communication device of said plurality of communication devices, wherein said first communication device is configured to selectively:
  form a first network with said second communication device; and
  form a second network with said third communication device.

9. A communication system in accordance with claim 8, wherein data transmitted within said first network is prevented from being transmitted within said second network.

10. A communication system in accordance with claim 9, wherein said first communication device is configured to selectively form a third network comprising said first network and said second network, such that data transmitted within said third network is transmitted within each of said first network and said second network.

11. A communication system in accordance with claim 7, wherein each said controller is further configured to prioritize the list of plays based on the received event information.

12. A communication system in accordance with claim 7, wherein each said communication device further comprises a display configured to display at least one graphical indication associated with the received event information.

13. A communication system in accordance with claim 7, wherein each said controller is further configured to selectively display the list of plays based on the received event information.

14. A communication system in accordance with claim 7, wherein each said communication device is configured to associate data received with at least one of the plays in the list of plays.

15. A communication system in accordance with claim 7, wherein each said communication device is configured to:
  wirelessly communicate data associated with at least one play selected from the list of plays; and
  update the list of plays in real-time during the sporting event.

16. A method for communicating with sporting event participants in a sporting event, said method comprising:
  providing a plurality of communication devices;
  communicatively coupling together a first plurality of communication devices of the plurality of communication devices to form a first network; and
  transmitting, by at least one communication device of the first plurality of communication devices, data including at least one of audio signals and at least one play associated with the sporting event within the first network, wherein the at least one play is at least one play to be performed by a sporting event participant.

17. A method in accordance with claim 16, further comprising:
  communicatively coupling together a second plurality of communication devices of the plurality of communication devices to form a second network; and
  transmitting data including at least one of audio signals and at least one play within the second network.

18. A method in accordance with claim 17, further comprising configuring the first network and the second network such that data transmitted within the first network is not transmitted within the second network, and data transmitted within the second network is not transmitted within the first network.

19. A method in accordance with claim 17, further comprising:
  communicatively coupling together a third plurality of communication devices of the plurality of communication devices to form a third network; and
  transmitting data including at least one of audio signals and at least one play within the third network.

20. A method in accordance with claim 19, further comprising configuring the third network to overlap at least one of the first network and the second network such that data transmitted within the third network is transmitted within the at least one of the first network and the second network.

* * * * *